US006655245B2

(12) United States Patent
Schuettel

(10) Patent No.: US 6,655,245 B2
(45) Date of Patent: Dec. 2, 2003

(54) METHOD OF OPTIMIZING THE FUNCTIONING OF A MACHINING CENTER THROUGH ADJUSTMENT OF ITS TEMPERATURE

(75) Inventor: Patrick Schuettel, Roches (CH)

(73) Assignee: Tornos SA, Mountier (CH)

( * ) Notice: Subject to any disclaimer, the term of this patent is extended or adjusted under 35 U.S.C. 154(b) by 0 days.

(21) Appl. No.: 10/128,506

(22) Filed: Apr. 24, 2002

(65) Prior Publication Data

US 2002/0166422 A1 Nov. 14, 2002

(30) Foreign Application Priority Data

Apr. 25, 2001 (EP) .............................. 01810411

(51) Int. Cl.$^7$ ............................. B23B 1/00; B23B 27/10
(52) U.S. Cl. ............................. 82/1.11; 82/50; 82/901; 409/135
(58) Field of Search ........................... 82/1.11, 50, 900, 82/901; 409/131, 135; 173/3, 197, DIG. 3; 408/56

(56) References Cited

U.S. PATENT DOCUMENTS

| | | | |
|---|---|---|---|
| 2,734,415 A | | 2/1956 | Mobius |
| 5,228,369 A | * | 7/1993 | Itoh et al. ............... 82/1.11 |
| 5,476,137 A | | 12/1995 | Ochiai et al. |
| 5,527,400 A | * | 6/1996 | Smith et al. ............... 82/142 |
| 6,382,886 B1 | * | 5/2002 | Jaeger ..................... 82/1.11 |

FOREIGN PATENT DOCUMENTS

| | | |
|---|---|---|
| EP | 0 347 821 A2 | 12/1989 |
| GB | 987368 | 3/1965 |
| GB | 2 114 924 A | 9/1983 |

\* cited by examiner

Primary Examiner—Willmon Fridie, Jr.
(74) Attorney, Agent, or Firm—Oliff & Berridge, PLC

(57) ABSTRACT

A method of optimizing the functioning of a machining center for machining, at least one piece, by removal of material by means of at least one cutting tool. The machining center includes a certain number of different components including at least a structure, such as a frame, and at least one motor elements for producing actions of driving and displacement of at least the cutting tool and the piece. Further, the method includes an installation for lubricating and cooling the tool and the piece by means of a fluid, (i.e., lubricant) by determining at least one temperature value for the lubricant, at least empirically, referred to as the reference value, at which the machining center functions in a stable way, (e.g., produces pieces of choice and consistent quality);

during use of the machining center for the production of pieces;

changing the temperature of the lubricant in such a way as to adjust it to the reference value; and changing the temperature of at least one of the components of the machining center in such a way as to bring the temperature of the at least one of the components to a value closer to the temperature of the lubricant.

12 Claims, 1 Drawing Sheet

METHOD OF OPTIMIZING THE FUNCTIONING OF A MACHINING CENTER THROUGH ADJUSTMENT OF ITS TEMPERATURE

BACKGROUND OF THE INVENTION

This invention relates to a method of optimizing the functioning of a machining center through adjustment of its temperature. Designated by machining center is a machine for machining at least one piece through removal of material by means of at least one cutting tool. The invention also relates to a facility for implementing the method and to a machining center the functioning of which is optimized by implementation of said method.

The invention aims at optimization of the functioning of a machining center for machining at least one piece by removal of material by means of at least one cutting tool, this machining center, on the one hand, comprising a certain number of components including a structure, such as a frame, and motor elements producing actions of driving and displacement of at least one of the elements which are the tool and the piece, and, on the other hand, implementing an installation for lubricating and cooling the tool and the piece by means of a fluid, referred to hereinafter as the lubricant.

The invention concerns particularly, but not exclusively, a method of optimizing the functioning of a lathe.

In the field of machine tools, when stable functioning of a machining center is desired, i.e. desired is the production of pieces of choice and consistent quality, air-conditioning of the premises where the machining center is located is known and/or stabilizing the temperature of the lubrication fluid. These solutions have their advantages, but they do not provide results that are entirely satisfactory.

A result which the invention aims to obtain is a method for optimizing the functioning of a machining center that would overcome the drawbacks of the prior art.

SUMMARY OF THE INVENTION

To this end, the invention has as its subject matter, a method of optimizing the functioning of a machining center for machining, at least one piece, by removal of material by means of at least one cutting tool. The machining center includes a certain number of different components including at least a structure, such as a frame, and at least one motor element for producing actions of driving and displacement of at least the cutting tool and the piece.

In an exemplary embodiment, the method includes an installation for lubricating and cooling the tool and the piece by means of a fluid, referred to hereinafter as the lubricant, by determining at least one temperature value for the lubricant, at least empirically, referred to as the reference value, at which the machining center functions in a stable way, i.e. produces pieces of choice and consistent quality; during use of the machining center for the production of pieces, changing the temperature of the lubricant in such a way as to adjust it to the reference value; and changing the temperature of at least one of the components of the machining center in such a way as to bring this temperature to a value close to the temperature of the lubricant, wherein, in order to change the temperature of at least one of the different components of the machining center and bring this temperature to a value close to the temperature reference value.

In a further exemplary embodiment, the method according to the invention includes confining the machining center at least partially in an enclosure with at least two openings suitable for entry and exit of an air current, and causing, through agitation at the level of at least one of the openings, an air current to circulate in the enclosure, the temperature of the air current having been changed beforehand in order to adjust it to a value substantially equal to the temperature reference value.

The invention also has as its subject matter a facility for implementing this method as well as a machining center of which has been optimized by implementing this method.

BRIEF DESCRIPTION OF THE DRAWINGS

The invention will be better understood from reading the description which follows, given by way of non-limiting example, with reference to the attached drawing.

DETAILED DESCRIPTION OF PREFERRED EMBODIMENTS

Figure 1:
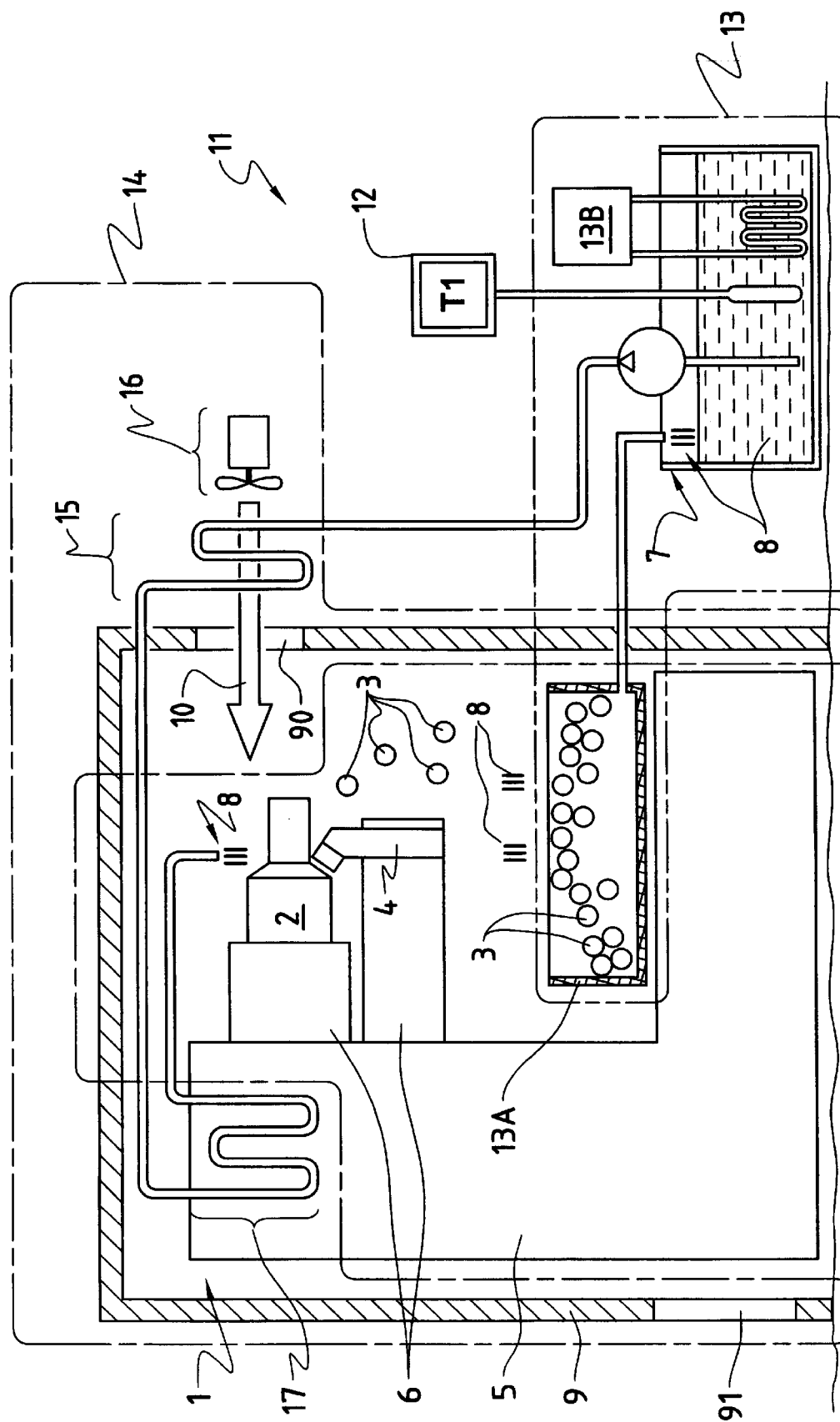
FIG. 1 is a diagrammatic view in section of a facility for implementing the method according to the invention.

Referring to the drawing, a machining center 1 can be seen for machining at least one piece 2 through removal of fragments 3 of material by means of at least one cutting tool 4.

The machining center 1 could be a lathe, for example, but is not limited to a lathe, and thus a lathe is not clearly apparent from the drawing.

In an exemplary embodiment, the machining center 1 includes a certain number of different components 5, 6 including at least one structure, such as a frame 5, and motor elements 6 for producing actions of driving and displacement of at least the tool 4 and the machined piece 2. The machining center 1 implements an installation 7 for lubricating and cooling the tool 4 and the piece 2 by means of a fluid 8, referred to hereinafter as the lubricant 8.

To optimize the functioning of the machining center, at least one temperature value T1 is determined, at least empirically, for the lubricant 8, referred to as the temperature reference value T1, at which the machining center 1 functions in a stable way, i.e. produces pieces 2 of choice and consistent quality.

During use of the machining center 1 for the production of pieces 2, the temperature of the lubricant 8 is changed in such a way as to adjust it to the temperature reference value T1, and the temperature of at least one of the different components 5, 6 of this machining center 1 is changed in such a way as to bring this temperature of this at least one of the different components of the machining center to a value close to the temperature of the lubricant 8.

It is to be noted that, in order to change the temperature of the machining center 1 and to bring this temperature to a value close to the temperature reference value, the method according to the invention further includes confining the machining center 1, at least partially in an enclosure 9 with at least two openings 90, 91 suitable for entry and exit of an air current 10. The air current 10 circulates in the enclosure 9 through agitation at the level of at least one of the openings 90, 91. The temperature of the air current having been changed beforehand in order to adjust it to a value substantially equal to the temperature reference value T1.

By following this method, it is possible to obtain the essential result of the invention, i.e. the optimization of functioning of a machining center 1 through reduction of different temperature gradients which exist in the machining center 1 between, the temperature of the lubricant 8, and the temperature of each of the different components 5, 6 of the machine 1.

Further, by following this method, the optimal temperature for the functioning of the machining center 1 can be achieved in a considerably accelerated way.

It is also to be noted that in order to change the temperature of the air current 10 injected into the enclosure and to adjust this temperature to a value substantially equal to the temperature reference value T1, an exchange of calories with the lubricant 8 is brought about.

Following these steps of the method makes it possible to achieve the optimization of the functioning of a machining center without having to resort to a complicated and costly solution.

It is to be noted furthermore that in order to change the temperature of the machine 1 and to bring it to a value close to the temperature reference value T1, the lubricant 8 is made to circulate in contact with at least one of the different components 5, 6 of the machining center 1.

The lubricant 8 is preferably made to circulate inside at least one of these different components 5, 6 of the machining center 1.

It is to be noted that to change the temperature of the lubricant 8 in such a way as to adjust it to the temperature reference value T1, either calories are supplied to the lubricant 8 or calories are withdrawn therefrom.

The invention also relates to a facility 11 for implementation of the method described above. The facility 11 for implementation of the method is noteworthy in that it includes:

a first device 12 for determining, at least empirically, at least one temperature value T1 for the lubricant 8, referred to as the temperature reference value T1 at which the machining center 1 functions in a stable way, i.e. produces pieces of choice and consistent quality, a second device 13 for changing the temperature of the lubricant 8, during use of the machining center 1 for the production of pieces 2, in such a way as to adjust this temperature to the temperature reference value T1, and a third device 14 for changing the temperature of this machining center 1, during use of the machining center 1 for the production of pieces 2, in such a way as to adjust this temperature to a value close to the temperature of the lubricant 8, the third device 14 including:

an enclosure 9 for at least partial confinement of the machining center 1, this enclosure 9 comprising at least two openings 90, 91 of section suitable to allow the passage of an air current 10, a second apparatus 15, referred to as the apparatus for adjusting the temperature of the air current 10 to a value substantially equal to the temperature reference value T1, and a third apparatus 16 referred to as the apparatus for circulating the air current 10 in the enclosure 9 through at least one of the openings 90, 91 and through the second apparatus 15.

The facility 11 is also noteworthy in that the first device 12 comprises temperature sensors connected to a recording apparatus.

One skilled in the art will be able to study the recorded information and determine the lubricant temperature at which the machine produces in a stable manner pieces of choice and consistent quality.

The facility 11 is noteworthy furthermore in that the second device 13 comprises at least one of the two elements 13A, 13B which are:

a receptacle 13A for collection of fragments 3 of material detached from the piece 2 and of lubricant 8, and a first apparatus 13B consisting of a thermal apparatus for allowing supply or withdrawal of calories to or from the lubricant 9 to bring the temperature of the lubricant to the temperature reference value T1.

It is thus understood that the lubricant 8 can gain calories through contact with the fragments 3 of material removed from the pieces 2, and/or can gain or lose calories through passage through the first apparatus 13B comprising a thermal apparatus that permits stabilization of the temperature of the lubricant 8 at a value close to the temperature reference value T1.

Further, it is noteworthy that the second apparatus 15, referred to as the apparatus for adjusting the temperature of the air current 10 to a value substantially equal to the temperature reference value T1, comprises a thermal exchanger 15 which makes possible in addition the circulation of the lubricant 8.

The third apparatus 16, referred to as the apparatus for causing circulation of the air current 10, consists of a ventilator.

Likewise noteworthy is that the third device 14 comprises at least one length of pipe 17, which allows circulation of the lubricant 8, and passes through at least one of the different components 5, 6 of the machining center 1.

These last-mentioned technical features add to the efficiency of the method according to the invention by accelerating the reaching of the most efficient temperature for the machine.

What is claimed is:

1. A method of optimizing the functioning of a machining center for machining, at least one piece, by removal of material by means of at least one cutting tool, the machining center includes a number of components, such as a frame and at least one motor elements for producing actions of driving and displacement of at least the cutting tool and the piece, and implements an installation for lubricating and cooling the cutting tool and the piece by a lubricant, the method comprising:

determining at least one temperature reference value for the lubricant, such that the machining center functions in a stable way;

changing a temperature of the lubricant in such a way as to adjust it to the temperature reference values;

changing a temperature of at least one of the components of the machining center in such a way as to bring the temperature of at least one of the components to a value closer to the temperature of the lubricant, and brings the temperature of at least one of the components closer to the temperature reference value;

confining the machining center at least partially in an enclosure with at least two openings for entry and exit of an air current; and circulating the air current in the enclosure through agitation at the level of at least one of the openings, a temperature of the air current having been changed beforehand in order to adjust it to a value substantially equal to the temperature reference value.

2. The method according to claim 1, further comprises the step of causing the air current to exchange calories with the lubricant to change the temperature of the air current injected into the enclosure and adjust the temperature to the value substantially equal to the temperature reference value.

3. The method according to claim 2, further comprises the step of causing the lubricant to circulate in contact with at least one of the components of the machining center to change the temperature of the machining center and to bring the temperature to a value closer to the temperature reference value.

4. The method according to claim 1, further comprises carrying out one of the operations consisting of supplying calories to the lubricant and withdrawing calories from the lubricant to change the temperature of the lubricant in such a way as to adjust the temperature to the temperature reference value.

5. The method according to claim 2, further comprises carrying out one of the operations consisting of supplying calories to the lubricant and withdrawing calories from the lubricant to change the temperature of the lubricant in such a way as to adjust the temperature to the temperature reference value.

6. The method according to claim 3, further comprises carrying out one of the operations consisting of supplying calories to the lubricant and withdrawing calories from the lubricant to change the temperature of the lubricant in such a way as to adjust the temperature to the temperature reference value.

7. A facility for implementing the method according to claim 1, wherein the facility comprises:

a first device for determining the at least one temperature reference value for the lubricant, second device for changing the temperature of the lubricant, during use of the machining center for the production of pieces, in such a way as to adjust the temperature to the temperature reference value, and a third device for changing the temperature of the machining center, during use of the machining center for the production of pieces, in such a way as to adjust the temperature to the value closer-to the temperature of the lubricant, wherein the third device includes:

an enclosure for at least partial confinement of the machining center, the enclosure having at least two openings to allow the passage of an air current, a second apparatus, for adjusting the temperature of the air current to a value substantially equal to the temperature reference value, a third apparatus, for circulating the air current in the enclosure through the at least one of the openings and through the second apparatus.

8. The facility according to claim 7, wherein the first device comprises temperature sensors connected to a recording apparatus.

9. The facility according to claim 7, wherein the second device comprises at least one of two elements which are:

a receptacle for collection of fragments of material detached from the piece and the lubricant, and a thermal apparatus for allowing supply or withdrawal of calories to or from the lubricant to bring the temperature of the lubricant to the temperature reference value.

10. The facility according to claim 7, wherein the second apparatus, further comprises a thermal exchanger for circulation of the lubricant.

11. The facility according to claim 7, wherein the third device further comprises at least one length of pipe which allows for circulation of the lubricant and on the other hand passes through at least one of the components of the machining center.

12. A machining center whose functioning is optimized by use of a facility according to claim 7.

* * * * *